United States Patent
Carrion et al.

(10) Patent No.: US 11,312,337 B2
(45) Date of Patent: Apr. 26, 2022

(54) DEVICE FOR CLEANING AN OPTICAL DETECTION SYSTEM OF A MOTOR VEHICLE

(71) Applicant: Valeo Systèmes d'Essuyage, Le Mesnil Saint Denis (FR)

(72) Inventors: Julien Carrion, Issoire (FR); Christophe Chassaing, Issoire (FR); Grégory Kolanowski, Issoire (FR); Chantal Marquet, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 868 days.

(21) Appl. No.: 16/076,088

(22) PCT Filed: Jan. 31, 2017

(86) PCT No.: PCT/EP2017/051996
§ 371 (c)(1),
(2) Date: Aug. 7, 2018

(87) PCT Pub. No.: WO2017/137277
PCT Pub. Date: Aug. 17, 2017

(65) Prior Publication Data
US 2021/0188218 A1    Jun. 24, 2021

(30) Foreign Application Priority Data
Feb. 9, 2016 (FR) ........................................ 1650997

(51) Int. Cl.
*B60S 1/52* (2006.01)
*B60S 1/54* (2006.01)
(Continued)

(52) U.S. Cl.
CPC . *B60S 1/52* (2013.01); *B60S 1/54* (2013.01); *B60S 1/56* (2013.01); *G02B 27/0006* (2013.01)

(58) Field of Classification Search
CPC ...... B60S 3/04; B60S 1/52; B60S 1/54; B60S 1/56; B60S 1/026; G02B 27/0006;
(Continued)

(56) References Cited

U.S. PATENT DOCUMENTS

| 2011/0073142 A1* | 3/2011 | Hattori ..................... B60S 1/56 |
| | | 134/56 R |
| 2015/0040953 A1 | 2/2015 | Kikuta et al. |
| 2015/0344001 A1* | 12/2015 | Lopez Galera ........... B60S 1/56 |
| | | 134/198 |

FOREIGN PATENT DOCUMENTS

| CN | 102029976 A | 4/2011 |
| CN | 201923085 U | 8/2011 |

(Continued)

OTHER PUBLICATIONS

International Search Report issued in PCT/EP2017/051996 dated Apr. 3, 2017 (2 pages).

(Continued)

*Primary Examiner* — Katina N. Henson
(74) *Attorney, Agent, or Firm* — Osha Bergman Watanabe & Burton LLP

(57) ABSTRACT

The invention concerns a cleaning device (5) for an optical sensor (9) module (3) of a motor vehicle comprising a housing (7), an optical sensor (9) housed in the housing (7), characterised in that the cleaning device (5) comprises a cylindrical flange (21) having first snap-fastening members (23) shaped to engage with second snap-fastening members (25) carried by the sensor (9) module (3), the first (23) and second (25) snap-fastening members being configured such that, in the mounted state, the axis of the cylindrical flange (Continued)

(21) merges with the optical axis (A) of the optical sensor (9), and at least one pipe (35; 37) having spray openings (350; 370) is attached to the inner wall (33) of the cylindrical flange (21), the spray openings (350; 370) being turned towards the optical sensor (9).

8 Claims, 1 Drawing Sheet

(51) Int. Cl.
*B60S 1/56* (2006.01)
*G02B 27/00* (2006.01)
(58) Field of Classification Search
CPC .. G02B 17/02; B08B 7/04; B08B 3/02; B08B 17/02
USPC ....................................................... 15/250.01
See application file for complete search history.

(56) References Cited

FOREIGN PATENT DOCUMENTS

| | | |
|---|---|---|
| CN | 104369720 A | 2/2015 |
| CN | 104508552 A | 4/2015 |
| CN | 104797971 A | 7/2015 |
| CN | 105128826 A | 12/2015 |
| EP | 2 949 521 A1 | 12/2015 |
| JP | 2015216463 A | 12/2015 |
| KR | 20110026220 A | 3/2011 |
| TW | M398497 U | 2/2011 |

OTHER PUBLICATIONS

Written Opinion of the International Searching Authority issued in PCT/EP2017/051996 dated Apr. 3, 2017 (5 pages).
The First Office Action issued in corresponding Chinese Application No. 201780014981.7, dated Feb. 2, 2021 (13 pages).

* cited by examiner

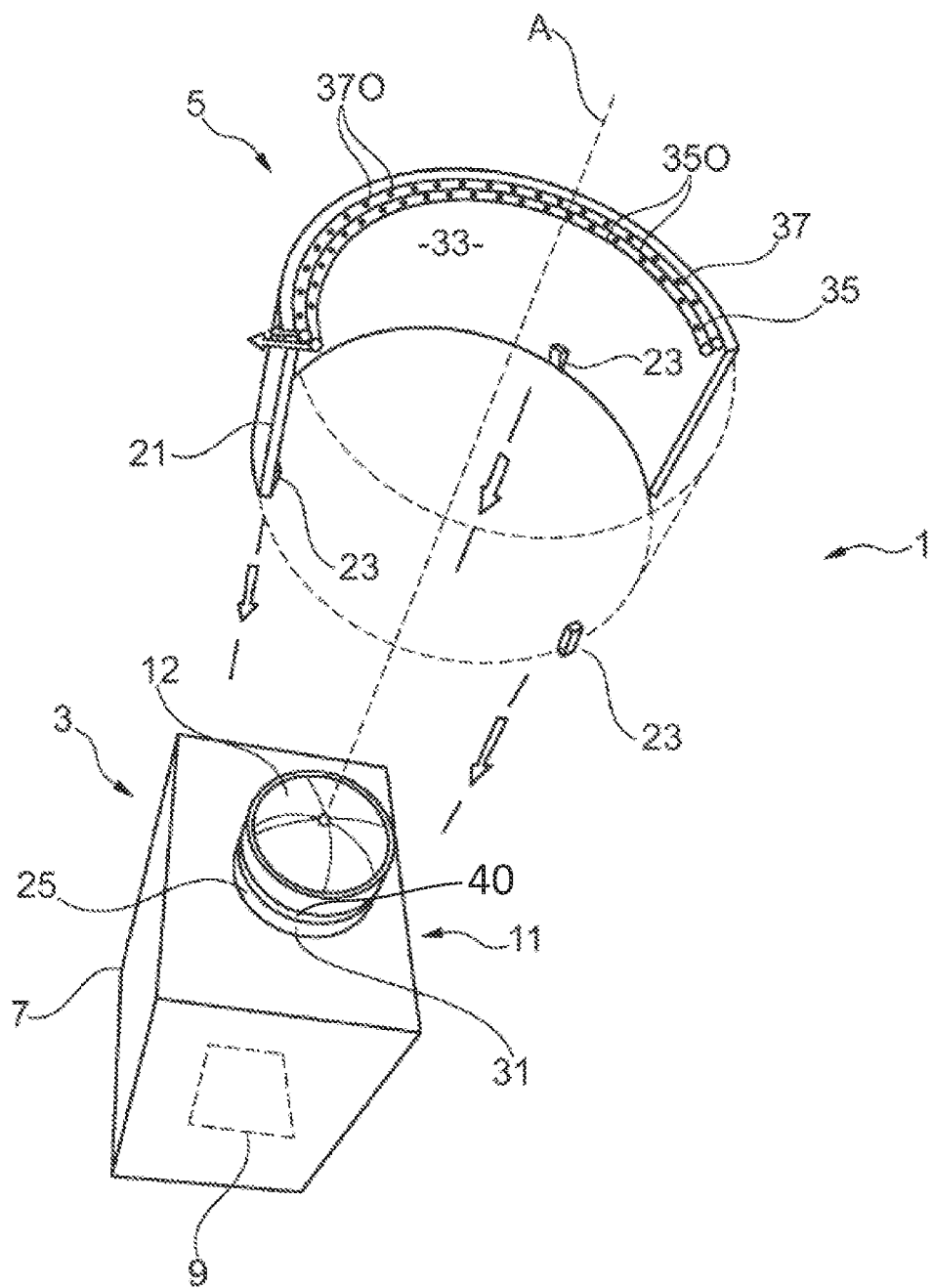

DEVICE FOR CLEANING AN OPTICAL DETECTION SYSTEM OF A MOTOR VEHICLE

The present invention relates to the field of driving assistance and in particular to the optical detection systems such as cameras, installed on certain vehicles. More particularly, the invention deals with a cleaning device for such an optical detection system, in particular for driving assistance in order for the quality of the information supplied to the driver to be optimal.

An optical detection system is the term used for any system comprising optical sensors, such as cameras, laser sensors (commonly called LIDARS) or other sensors based on the emission and/or the detection of light in the spectrum visible or invisible to human beings, in particular the infrared.

These days, viewing cameras, in particular rear-viewing cameras, are installed in a large number of current motor vehicles, and they notably form part of a parking assistance system which makes it possible to park more easily in a space without turning round and detecting the obstacles situated behind the vehicle.

Cameras are known which are installed inside the interior against the rear window aiming toward the rear from the rear window of the vehicle. These cameras are well protected from the outdoor climatic influences and can, for example, benefit from de-icing and cleaning systems of the rear window, for example a heating wire incorporated in the glass of the rear window.

However, the viewing angle is not optimal, in particular for parking assistance and, for this reason, it is preferable for the camera to be arranged on the rear bumper or on the rear registration plate of the vehicle.

In this case, the camera is therefore greatly exposed to the spraying of dirt which can be deposited on its optic and thus reduce its efficiency, or even render it inoperative.

Particularly in rainy weather, sprays of rain and of dirt are observed which can greatly affect the operability of the optical detection system.

To counter the deposition of dirt on the camera, it is known practice to arrange a device for cleaning the optic of the camera, generally a cleaning liquid spray nozzle, in proximity thereto, to eliminate the polluting elements which are deposited over time.

The document US2015/0040953 describes such a cleaning device which comprises, in a first embodiment, a lateral spray nozzle which can be snap-fitted to conformed lateral protuberances of a housing containing the camera. However, this solution is too bulky and too visible to the naked eye for a user and harmful to the appearance. Furthermore, the lateral spray nozzle can project only a washing liquid, which can give rise to traces if drops of the washing liquid remain on the lens or the protection glass of the camera.

According to a second embodiment, a cleaning device is produced in the form of a molded part made of plastic material and is assembled in front of the camera. However, this molded part, which includes internal channels for the washing liquid, is complex to manufacture and costly.

The present invention sets out to at least partially remedy one or more of the abovementioned drawbacks by presenting an alternative optical detection system cleaning device that allows easy adaptation while being inexpensive and easy to mount.

To this end, the subject of the invention is a cleaning device for an optical sensor module of a motor vehicle comprising a housing, an optical sensor housed in the housing, characterized in that the cleaning device comprises a cylindrical flange having first snap-fitting members shaped to cooperate with second snap-fitting members borne by the sensor module, the first and second snap-fitting members being configured in such a way that, in the mounted state, the axis of the cylindrical flange coincides with the optical axis of the optical sensor, and at least one pipe having spray orifices is fixed to the inner wall of the cylindrical flange, the spray orifices being oriented toward the optic.

The cleaning device according to the invention can also have one or more of the following features, taken alone or in combination:

According to one aspect, the first snap-fitting members comprise ramps suitable for cooperating with a circular groove forming the second snap-fitting members and formed in a support of the sensor module.

According to another aspect, the device comprises three first snap-fitting members distributed regularly on the inner wall of the cylindrical flange.

The first snap-fitting members are for example produced in a single piece with the cylindrical flange.

According to yet another aspect, the device comprises a first and a second pipe each having spray orifices and fixed parallel to one another against the inner wall of the cylindrical flange, the first pipe being intended to spray a washing liquid, the second pipe being intended to spray compressed air.

The first and the second pipes have, for example, different diameters, in particular the second pipe has a smaller diameter than the first pipe.

Said at least one first pipe can be fixed by gluing against the inner wall of the cylindrical flange.

Said at least one first pipe extends, for example, only over half the inner perimeter of the cylindrical flange.

The invention relates also to an optical sensor module comprising a housing, an optical sensor housed in the housing, characterized in that it comprises a cleaning device as defined above.

Other advantages and features will become apparent on reading the description of the invention, as well as the single attached drawing which shows an exploded perspective diagram with a partial cutaway of an optical detection system according to an embodiment.

The embodiments described are examples. Although the description refers to one or more embodiments, this does not necessarily mean that each reference relates to the same embodiment, or that the features apply only to a single embodiment. Single features of different embodiments can also be combined to provide other embodiments.

The single FIG. 1 shows an embodiment of an optical detection system 1 according to the invention for a motor vehicle.

The optical detection system 1 is for example intended to be mounted at the rear of a motor vehicle, for example on a bumper or a registration plate (not represented). It can also, for example, be mounted on the sides of the vehicle, for example by replacing the side rear-view mirrors.

The optical detection system 1 comprises an optical sensor module 3, in particular a camera and a cleaning device 5 for the optic of the optical sensor module 3.

The optical sensor module 3, for example a camera module, comprises a housing 7, an optical sensor 9, in particular an exposure sensor (drawn schematically in dotted lines), housed in the housing 7, and an optic 11, in particular a protection glass 12, arranged in front of the sensor 9 and forming at least a part of the wall of the housing 7.

The housing 7 hermetically and tightly encloses the optical sensor.

The protection glass 11 can be made of glass or of crystal polycarbonate.

The optical sensor 9 is, for example, a CCD (charged coupled device) sensor or a CMOS sensor composed of a matrix of miniature photodiodes. According to another variant, it can be a LI DAR sensor.

The optic 11 also comprises, for example, a convex (domed) lens such as a fish-eye optic.

Generally, the optic 11 comprises any optical element such as, for example, the protection glass 12 and a lens, arranged in front of the sensor 9. In certain conditions, there is no protection glass and this function is ensured by the lens fixed tightly onto the housing 7.

The optical sensor 9 is installed in the module 3 so as to aim through said protection glass 12 along its optical axis A.

The cleaning device 5 comprises a cylindrical flange 21 having first snap-fitting members 23 shaped to cooperate with second associated snap-fitting members 25 borne by the sensor module 3.

The first 23 and second 25 snap-fitting members are configured in such a way that, in the mounted state, the axis of revolution of the cylindrical flange 21 coincides with the optical axis A of the optical sensor 9.

As represented in FIG. 1, the first snap fitting members 23 comprise, for example, ramps suitable for cooperating with a circular groove 40 forming the second snap fitting members 25 and formed in a support 31 of the optic 11, for example the lens, arranged in front of the optical sensor 9. Obviously, it is also possible to envisage forming the second snap fitting members 25 by three individual notches instead of a peripheral groove.

According to one embodiment, provision is made for the three first snap-fitting members 23 to be distributed regularly on an inner wall 33 of the cylindrical flange 21 to facilitate the centering.

The first snap-fitting members 23 are in particular produced in a single piece with the cylindrical flange 21.

The cleaning device 5 also comprises at least one pipe, in the present case a first 35 and a second 37 pipe, each having spray orifices respectively 35O and 37O.

The first 35 and the second 37 pipes are fixed parallel to one another to the inner wall 33 of the cylindrical flange 21, for example by gluing. They are for example flexible and soft pipes made of rubber. According to a variant not represented, pipes can be used that are flat and do not have a circular diameter, which makes it possible to facilitate the fixing by gluing.

According to a variant not represented, hooks are provided fixed onto the inner wall 33, arranged on either side and staggered for fixing the pipes 35 and 37 and holding them in position. The hooks are for example also made of a single piece with the cylindrical flange 21.

The two pipes 35 and 37 are arranged so that the spray orifices 35O and 37O are oriented toward the optic 11 arranged in front of the optical sensor 9.

The first pipe 35 is intended to spray a washing liquid and is linked to a tank of a washing liquid with a pump (not represented). The second pipe 37 is intended to spray compressed air and is linked to an air compressor (not represented).

Thus, after having sprayed a washing liquid onto the optic 11, the spraying of the compressed air makes it possible to drive away any remaining drops and dirt which could leave traces after drying.

To optimize, on the one hand, the bulk of the first 35 and second 37 pipes, the latter have different diameters, in particular the second pipe 37 for spraying compressed air has a smaller diameter than the first pipe 35 for the washing liquid.

In the interests of economy and also of dispelling of the sprayed washing liquid, the first 35 and second 37 pipes extend only over half, notably the top half, of the inner perimeter of the cylindrical flange 21.

It will therefore be understood that the cleaning device according to the invention adapts very easily to any optical detection system, in particular existing optical detection systems, for which it is possible to provide for them to be equipped with the cleaning device as a retrofit. It is distinguished by a low cost, few parts and reduced complexity, while allowing for an effective cleaning of the optic 11. It can be mounted and dismantled easily on an optical detection system 1, which also facilitates maintenance actions, for example in the case of plugging of the first 35 or second 37 pipes and/or of the spray orifices 35O and 37O.

The invention claimed is:

1. A cleaning device for an optical sensor module of a motor vehicle comprising:
   a housing;
   an optical sensor housed in the housing;
   a cylindrical flange having first snap-fitting members shaped to engage with second snap-fitting members borne by the sensor module, and
   a first pipe and a second pipe each having spray orifices and having different diameters,
   wherein the second pipe has a smaller diameter than the first pipe,
   the first and second snap-fitting members being configured in such a way that, in the mounted state, an axis of the cylindrical flange coincides with an optical axis of the optical sensor,
   wherein the first pipe and the second pipe are fixed to an inner wall of the cylindrical flange, the spray orifices being oriented toward the optical sensor.

2. The cleaning device as claimed in claim 1, wherein the first snap-fitting members comprise ramps for cooperating with a circular groove forming the second snap-fitting members and formed in a support of the sensor module.

3. The cleaning device as claimed in claim 1, further comprising three first snap-fitting members distributed regularly on the inner wall of the cylindrical flange.

4. The cleaning device as claimed in claim 1, wherein the first snap-fitting members are produced in a single piece with the cylindrical flange.

5. The cleaning device as claimed in claim 1, the first pipe and the second pipe are fixed parallel to one another against the inner wall of the cylindrical flange, the first pipe being configured to spray a washing liquid, the second pipe being configured to spray compressed air.

6. The cleaning device as claimed in claim 1, wherein the first pipe and the second pipe are fixed by gluing against the inner wall of the cylindrical flange.

7. The cleaning device as claimed in claim 1, wherein the first pipe and the second pipe extend only over half of an inner perimeter of the cylindrical flange.

8. An optical sensor module comprising:
   a housing;
   an optical sensor housed in the housing; and
   a cleaning device as claimed in claim 1.

* * * * *